US012586585B2

(12) United States Patent
Komeiji et al.

(10) Patent No.: US 12,586,585 B2
(45) Date of Patent: Mar. 24, 2026

(54) SPEECH RECOGNITION APPARATUS, CONTROL METHOD, AND NON-TRANSITORY STORAGE MEDIUM

(71) Applicant: NEC Corporation, Tokyo (JP)

(72) Inventors: Shuji Komeiji, Tokyo (JP); Hitoshi Yamamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 799 days.

(21) Appl. No.: 17/800,616

(22) PCT Filed: Mar. 16, 2020

(86) PCT No.: PCT/JP2020/011466
§ 371 (c)(1),
(2) Date: Aug. 18, 2022

(87) PCT Pub. No.: WO2021/186501
PCT Pub. Date: Sep. 23, 2021

(65) Prior Publication Data
US 2023/0076709 A1      Mar. 9, 2023

(51) Int. Cl.
*G10L 15/26*      (2006.01)
*G06F 40/20*      (2020.01)
(52) U.S. Cl.
CPC .............. *G10L 15/26* (2013.01); *G06F 40/20* (2020.01)
(58) Field of Classification Search
CPC ...... G10L 15/26; G10L 15/1815; G06F 40/20
USPC ........................................................ 704/200
See application file for complete search history.

(56) References Cited

FOREIGN PATENT DOCUMENTS

| | | |
|---|---|---|
| JP | H08-246988 A | 9/1996 |
| JP | 2006-012179 A | 1/2006 |
| JP | 2013101204 A * | 5/2013 |
| JP | 2014-521115 A | 8/2014 |
| JP | 2020-042131 A | 3/2020 |

OTHER PUBLICATIONS

International Search Report for PCT Application No., PCT/JP2020/011466, mailed on Jun. 16, 2020.
JP Office Action for JP Application No. 2022-508617, mailed on Oct. 24, 2023 with English Translation.

* cited by examiner

*Primary Examiner* — Thierry L Pham
(74) *Attorney, Agent, or Firm* — Sughrue Mion, PLLC

(57) ABSTRACT

A speech recognition apparatus (2000) acquires a plurality of pieces of audio data (20) for a source audio signal including an utterance. The speech recognition apparatus (2000) generates a candidate text group (30) for each of the plurality of pieces of audio data (20). The candidate text group (30) includes a plurality of candidate texts (32). The candidate text (32) is a candidate of a text representing a content of an utterance corresponding to the audio data (20), and represents a sentence. The speech recognition apparatus (2000) selects, based on a comparison result between the plurality of candidate text groups (30), for each of the pieces of audio data (20), a candidate text (32) representing a content of an utterance represented by the piece of audio data (20) from the candidate text group (30) generated for the piece of audio data (20).

18 Claims, 4 Drawing Sheets

Start

ACQUIRE SOURCE DATA 10 —— S102

GENERATE PLURALITY OF PIECES OF AUDIO DATA 20 FROM SOURCE DATA 10 —— S104

GENERATE CANDIDATE TEXT GROUP 30 FOR EACH PIECE OF AUDIO DATA 20 —— S106

SELECT, BASED ON COMPARISON RESULT BETWEEN CANDIDATE TEXT GROUPS 30, TEXT REPRESENTING CONTENT OF UTTERANCE CORRESPONDING TO EACH PIECE OF AUDIO DATA 20 FROM AMONG CANDIDATE TEXTS 32 —— S108

End

SPEECH RECOGNITION APPARATUS, CONTROL METHOD, AND NON-TRANSITORY STORAGE MEDIUM

This application is a National Stage Entry of PCT/JP2020/011466 filed on Mar. 16, 2020, the contents of all of which are incorporated herein by reference, in their entirety.

TECHNICAL FIELD

The present invention relates to speech recognition.

BACKGROUND ART

A speech recognition technique has been developed. By speech recognition, for example, an audio signal including an utterance of a person is converted into a text representing a content of the utterance.

For example, Patent Document 1 is known as a prior art document related to speech recognition. Patent Document 1 discloses a technique for determining a sentence, taking into consideration a chain probability between two adjacent words at a time of acquiring a sentence from audio data by speech recognition.

RELATED DOCUMENT

Patent Document

Patent Document 1: Japanese Patent Application Publication No. H8-248988

SUMMARY OF THE INVENTION

Technical Problem

The present inventor of the present application found that, in a case where a plurality of sentences are acquired from an audio signal, a probability with which contents of these plurality of sentences are associated with one another is high. In this regard, in the invention in Patent Document 1, although a chain probability between successive words is considered, relevance between sentences is not considered.

The present invention has been made in view of the above-described problem, and one of objects of the present invention is to provide a technique for improving accuracy of speech recognition.

Solution to Problem

A speech recognition apparatus according to the present invention includes a candidate generating unit that generates, for each of a plurality of pieces of audio data acquired from a source audio signal including an utterance, a candidate text group including a plurality of candidate texts each being a candidate of a text representing a content of an utterance corresponding to the piece of audio data, and a selecting unit that selects, based on a comparison result between the plurality of candidate text groups, for each of pieces of the audio data, a candidate text representing a content of an utterance represented by the piece of audio data from the candidate text group generated for the piece of audio data. The candidate text represents a sentence.

A control method according to the present invention is executed by a computer. The control method includes a candidate generating step of generating, for each of a plurality of pieces of audio data acquired from a source audio signal including an utterance, a candidate text group including a plurality of candidate texts each being a candidate of a text representing a content of an utterance corresponding to the piece of audio data, and a selecting step of selecting, based on a comparison result between the plurality of candidate text groups, for each of pieces of the audio data, a candidate text representing a content of an utterance represented by the piece of audio data from the candidate text group generated for the piece of audio data. The candidate text represents a sentence.

A program according to the present invention causes a computer to execute the control method according to the present invention.

Advantageous Effects of Invention

The present invention provides a technique for improving accuracy of speech recognition.

DESCRIPTION OF EMBODIMENTS

Hereinafter, an example embodiment according to the present invention is described with reference to the drawings. Note that, in all drawings, a similar constituent element is designated by a similar reference sign, and description thereof is omitted as necessary. Further, in each block diagram, each block represents a configuration of a functional unit instead of a configuration of a hardware unit, unless otherwise specifically described. In the following description, a predetermined value (such as a threshold value) of each kind is stored in advance in a storage apparatus accessible from a functional configuration unit using the value, unless otherwise specifically described.

Example Embodiment 1

Overview

Figure 1:
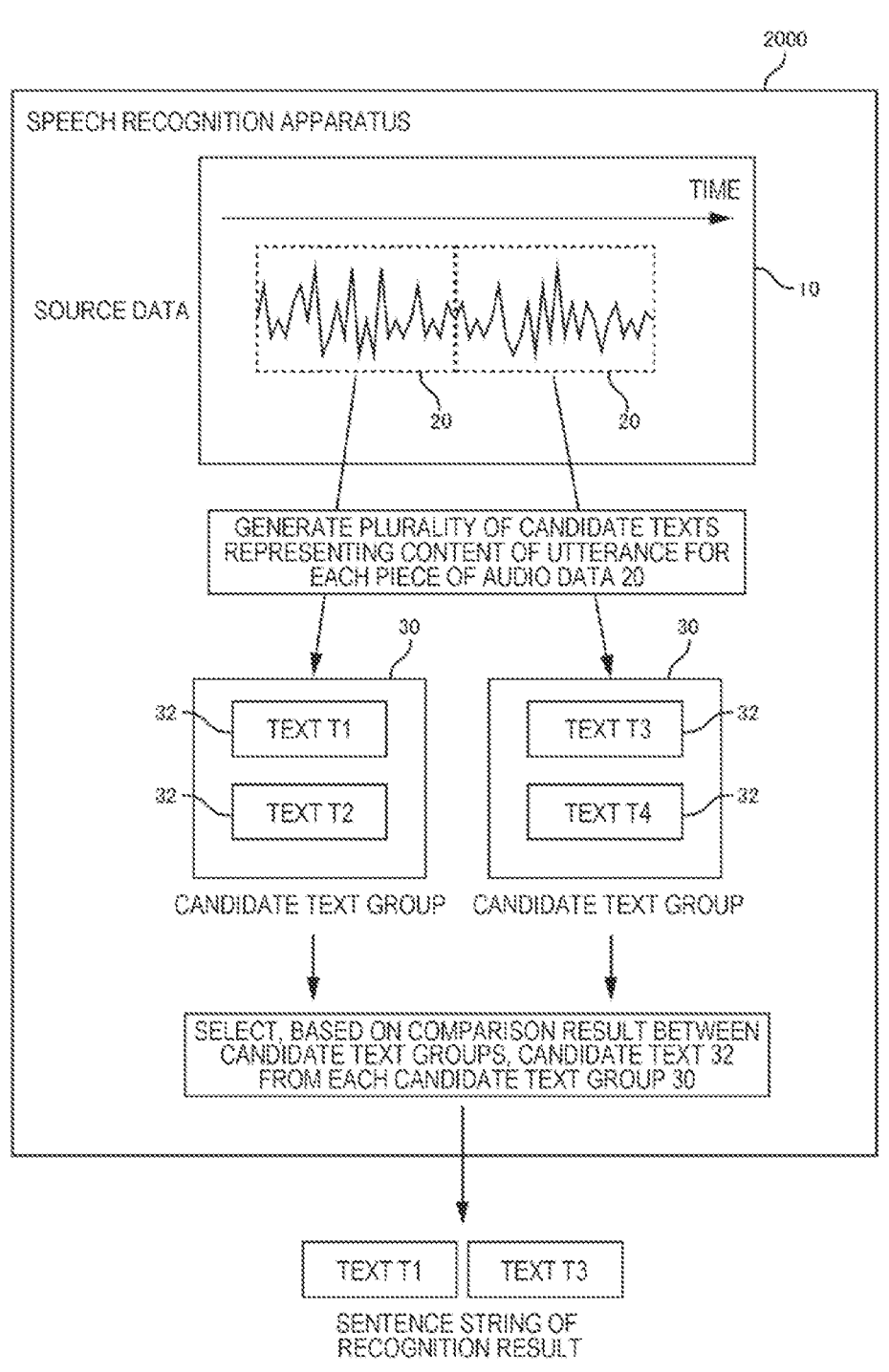
FIG. 1 is a diagram conceptually illustrating an operation of a speech recognition apparatus according to an example embodiment 1.

FIG. 1 is a diagram conceptually illustrating an operation of a speech recognition apparatus 2000 according to an example embodiment 1. Herein, an operation of the speech recognition apparatus 2000 described with reference to FIG. 1 is an example for easily understanding the speech recognition apparatus 2000, and does not limit an operation of the speech recognition apparatus 2000. Details and a variation of an operation of the speech recognition apparatus 2000 will be described later.

The speech recognition apparatus 2000 is used for converting a audio representing an utterance into a text representing a content of the utterance. For this reason, the speech recognition apparatus 2000 is operated as follows.

The speech recognition apparatus 2000 acquires source data 10. The source data 10 are audio data in which an utterance of a person is recorded, and are, for example, recorded data and the like of a conversation or a speech. Audio data are, for example, vector data and the like representing a waveform of an audio signal. Hereinafter, an audio signal represented by the source data 10 is also referred to as a source audio signal.

The speech recognition apparatus 2000 acquires a plurality of pieces of audio data 20 to be acquired from the source data 10. Apiece of the audio data 20 represents an audio signal corresponding to one sentence. An utterance represented by the source data 10 is constituted of a plurality of sentences. Therefore, a piece of the audio data 20 for each of a plurality of sentences is acquired from the source data 10.

The speech recognition apparatus 2000 generates, for each piece of the audio data 20, a plurality of candidates of texts each representing a sentence represented by a piece of audio data. Hereinafter, the candidate is referred to as a "candidate text". Further, a group of a plurality of candidate texts generated for one piece of the audio data 20 is referred to as a candidate text group 30.

The speech recognition apparatus 2000 determines, for each piece of the audio data 20, a text representing a sentence corresponding to the piece of audio data 20, taking into consideration relevance between sentences. For this reason, the speech recognition apparatus 2000 compares between candidate text groups 30 generated for each piece of the audio data 20, and determines, based on a comparison result between the candidate text groups 30, for each piece of the audio data 20, a candidate text 32 representing a sentence represented by the piece of audio data 20 from the candidate text group 30 generated for the piece of audio data 20.

For example, it is assumed that two pieces of audio data being a piece of audio data A and a piece of audio data B are acquired from source data 10. Further, it is assumed that two candidate texts T1 and T2 are included in a candidate text group 30 of the piece of audio data A, and two candidate texts T3 and T4 are included in a candidate text group 30 of the piece of audio data B. In this case, four pairs "T1 and T3", "T1 and T4", "T2 and T3", and "T2 and T4" are conceived, as a pair (a pair of sentences) of candidate texts 32 representing a content of an utterance represented by the source data 10. The speech recognition apparatus 2000 determines a pair of candidate texts 32 representing a content of an utterance represented by the source data 10 from among these four pairs by comparing the candidate text group 30 of the piece of audio data A, and the candidate text group 30 of the piece of audio data B. For example, in a case where a determined pair is "T1 and T3", T1 is determined as a text representing a content of an utterance represented by the piece of audio data A, and T3 is determined as a text representing a content of an utterance represented by the piece of audio data B.

One Example of Advantageous Effect

In the speech recognition apparatus 2000 according to the present example embodiment, in a case where a plurality of sentences are acquired from source data 10 by speech recognition, a plurality of candidates (candidate text groups 30) are generated for each sentence. Further, one sentence as a recognition result is determined from among a plurality of candidates for each sentence, based on comparison between candidates (comparison between the candidate text groups 30). Therefore, as compared with a case where comparison between candidates is not performed, speech recognition can be performed with high accuracy. In other words, a content of an utterance represented by source data 10 is configured into a text with higher accuracy.

Hereinafter, the speech recognition apparatus 2000 is described in more detail.

Example of Functional Configuration

Figure 2:
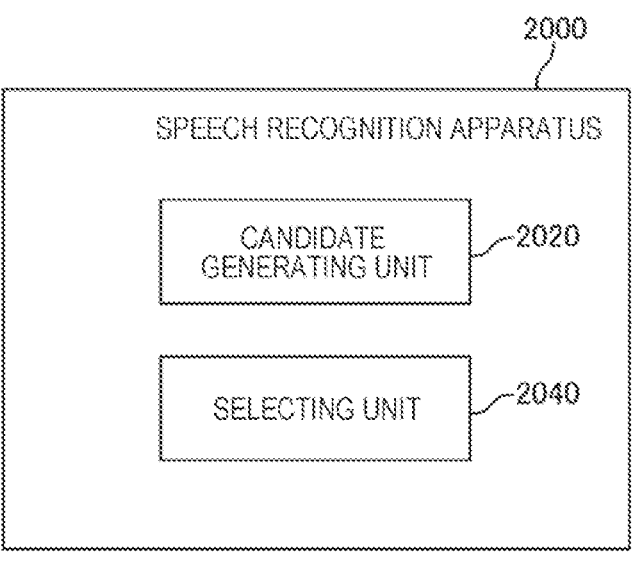
FIG. 2 is a block diagram illustrating a functional configuration of the speech recognition apparatus.

FIG. 2 is a block diagram illustrating a functional configuration of the speech recognition apparatus 2000. A candidate generating unit 2020 generates a candidate text group 30 for each of a plurality of pieces of audio data 20 acquired from source data 10. A selecting unit 2040 compares candidate text groups 30 acquired for each piece of the source data 20, and selects, based on a comparison result between the candidate text groups 30, a text representing a content of an utterance corresponding to each piece of the audio data 20 from among candidate texts 32 generated for the piece of audio data 20.

Example of Hardware Configuration

Each functional configuration unit of the speech recognition apparatus 2000 may be achieved by hardware (example: a hard-wired electronic circuit, and the like) achieving each functional configuration unit, or may be achieved by combination of hardware and software (example: combination of an electronic circuit and a program for controlling the electronic circuit, and the like). Hereinafter, a case where each functional configuration unit of the speech recognition apparatus 2000 is achieved by combination of hardware and software is further described.

Figure 3:
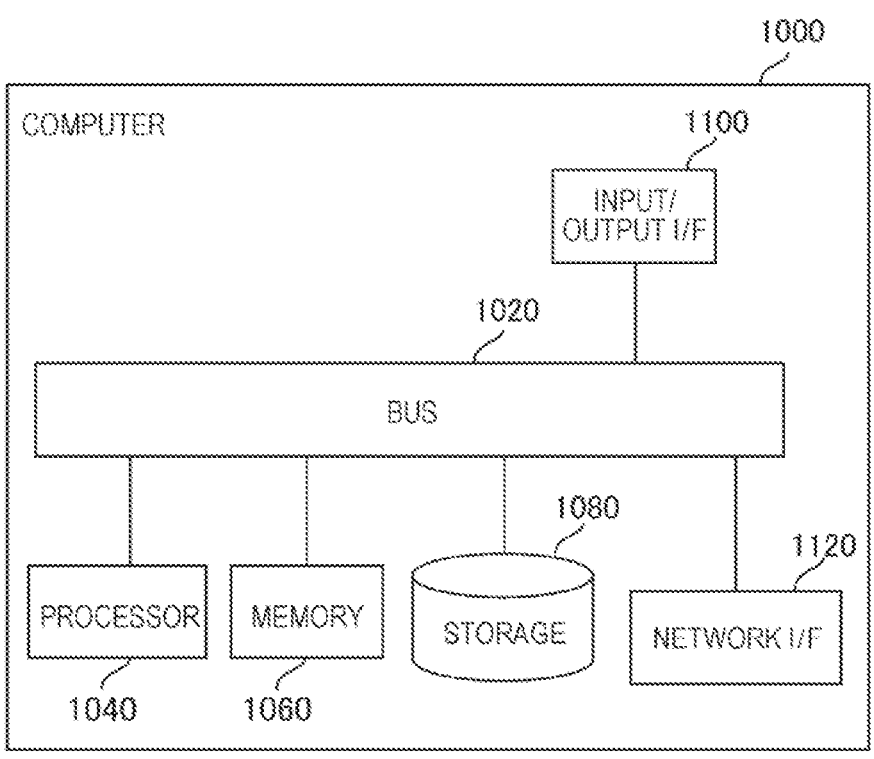
FIG. 3 is a diagram illustrating a computer for achieving the speech recognition apparatus.

FIG. 3 is a diagram illustrating a computer 1000 for achieving the speech recognition apparatus 2000. The computer 1000 is any computer. For example, the computer 1000 is a stationary computer such as a personal computer (PC) or a server machine. In addition to the above, for example, the computer 1000 is a portable computer such as a smartphone or a tablet terminal.

The computer 1000 may be a dedicated computer designed for achieving the speech recognition apparatus 2000, or may be a general-purpose computer. In the latter case, for example, the computer 1000 achieves each function of the speech recognition apparatus 2000 by installing a predetermined application in the computer 1000. The above-described application is configured of a program for achieving a functional configuration unit of the speech recognition apparatus 2000.

The computer 1000 includes a bus 1020, a processor 1040, a memory 1060, a storage device 1080, an input/output interface 1100, and a network interface 1120. The bus 1020 is a data transmission path along which the processor 1040, the memory 1060, the storage device 1080, the input/output interface 1100, and the network interface 1120 mutually transmit and receive data. However, a method of mutually connecting the processor 1040 and the like is not limited to bus connection.

The processor 1040 is various processors such as a central processing unit (CPU), a graphics processing unit (GPU), and a field-programmable gate array (FPGA). The memory 1060 is a main storage apparatus to be achieved by using a random access memory (RAM) or the like. The storage device 1080 is an auxiliary storage apparatus to be achieved by using a hard disk, a solid state drive (SSD), a memory card, a read only memory (ROM), or the like.

The input/output interface 1100 is an interface for connecting the computer 1000 to an input/output device. For example, the input/output interface 1100 is connected to an input apparatus such as a keyboard, and an output apparatus such as a display apparatus.

The network interface 1120 is an interface for connecting the computer 1000 to a communication network. The communication network is, for example, a local area network (LAN) or a wide area network (WAN).

The storage device 1080 stores a program (program achieving the above-described application) achieving each functional configuration unit of the speech recognition apparatus 2000. The processor 1040 achieves each functional configuration unit of the speech recognition apparatus 2000 by reading the program in the memory 1060 and executing the program.

Herein, the speech recognition apparatus 2000 may be achieved by one computer 1000, or may be achieved by a plurality of computers 1000. In the latter case, for example, the speech recognition apparatus 2000 is achieved as a distributed system including one or more computers 1000 achieving the candidate generating unit 2020, and one or more computers 1000 achieving the concatenating unit 2040.

<Flow of Processing>

Figure 4:
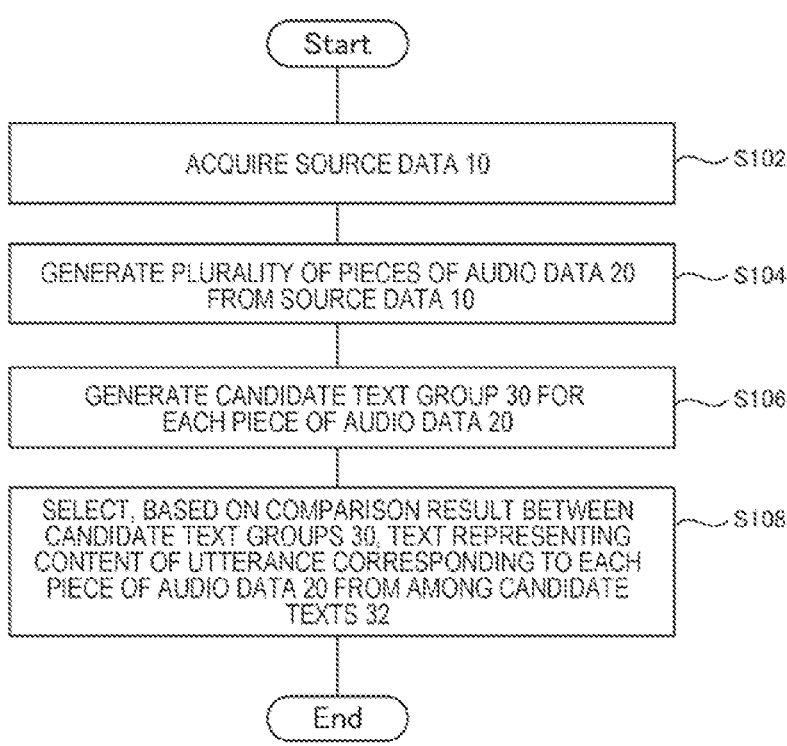
FIG. 4 is a flowchart illustrating a flow of processing to be performed by the speech recognition apparatus according to the example embodiment 1.

FIG. 4 is a flowchart illustrating a flow of processing to be performed by the speech recognition apparatus 2000 according to the example embodiment 1. The candidate generating unit 2020 acquires source data 10 (S102). The candidate generating unit 2020 generates a plurality of pieces of audio data 20 from the source data 10 (S104). The candidate generating unit 2020 generates a candidate text group 30 for each piece of the audio data 20 (S106). The selecting unit 2040 selects, based on a comparison result of the candidate text groups 30, a text representing a content of an utterance corresponding to each piece of the audio data 20 from among candidate texts 32 generated for each piece of the audio data 20 (S108).

<Acquisition of Source Data 10: S102>

The candidate generating unit 2020 acquires source data 10 (S102). A method of acquiring the source data 10 by the candidate generating unit 2020 is optional. For example, the candidate generating unit 2020 acquires the source data 10 by receiving the source data 10 to be transmitted from a user terminal being operated by a user. In addition to the above, for example, the candidate generating unit 2020 may acquire the source data 10 stored in a storage apparatus accessible from the candidate generating unit 2020. In this case, for example, the speech recognition apparatus 2000 accepts, from a user terminal, specification of the source data 10 (specification of a file name and the like) to be acquired. In addition to the above, for example, the candidate generating unit 2020 may acquire, as the source data 10, each of one or more pieces of data stored in the above-described storage apparatus. Specifically, in this case, batch processing is performed for a plurality of pieces of the source data 10 stored in advance in a storage apparatus.

<Generation of Audio Data 20: S104>

The candidate generating unit 2020 generates a plurality of pieces of audio data 20 from source data 10 (S104). Herein, an existing technique can be used as a technique for dividing audio data (source data 10 according to the present invention) including a plurality of sentences into audio data (audio data 20 according to the present invention) for each sentence. For example, the candidate generating unit 2020 divides the source data 10 for each audio section by performing audio section detection for the source data 10. Further, each of a plurality of pieces of audio data acquired by the division is handled as the audio data 20. Specifically, one piece of the audio data 20 is corresponding to one audio section to be acquired from the source data 10.

<Generation of Candidate Text Group 30: S106>

The candidate generating unit 2020 generates a candidate text group 30 for each piece of audio data 20 (S106). The candidate text group 30 is generated by performing speech recognition processing with respect to the audio data 20. For example, by performing speech recognition processing with respect to the audio data 20, the candidate generating unit 2020 generates information indicating a pair of a text having a possibility of representing a content of an utterance corresponding to the audio data 20, and a probability (hereinafter, also described as an accuracy) with which the text represents a content of an utterance corresponding to the audio data 20. Further, the candidate generating unit 2020 extracts top N texts in terms of a magnitude of accuracy from among a plurality of generated texts, and generates a candidate text group 30 constituted of the extracted texts. In other words, N-best recognition results to be acquired by performing speech recognition processing with respect to the audio data 20 are handled as a candidate text group 30. Note that, an existing technique can be used as a technique for generating a plurality of texts having a possibility of representing a content of an utterance, and a technique for computing a probability with which each text represents a content of the utterance, by performing speech recognition processing with respect to audio data including the utterance.

The number of elements (the above-described value N) in a candidate text group 30 may be fixedly defined in advance or may not be fixedly defined. In the latter case, for example, a lower limit value is defined for a magnitude of probability (specifically, a magnitude of accuracy of a candidate text 32), with which a candidate text 32 represents a content of an utterance corresponding to audio data 20. In this case, the candidate generating unit 2020 generates a plurality of pairs of the above-described text and an accuracy, and generates a candidate text group 30 constituted of extracted texts by extracting, from among the plurality of generated texts, only a text whose accuracy is equal to or more than the above-described lower limit value.

<Determination of Text: S108>

The selecting unit 2040 determines a candidate text 32 to be selected from each candidate text group 30 by performing comparison between the candidate text groups 30 (S108). Specifically, the selecting unit 2040 computes, for two candidate text groups 30 to be compared, an index value (hereinafter, a relevance index value) representing relevance between candidate texts 32 included in each candidate text group 30. By considering relevance between candidate texts 32 as described above, the relevance between the candidate texts 32 to be selected from each candidate text group 30 is made high.

For example, it is assumed that a piece of audio data A, a piece of audio data B, and a piece of audio data C are acquired from source data 10 in a time-series order. Further, it is assumed that candidate texts T1 and T2 are included in a candidate text group 30 of the piece of audio data A, candidate texts T3 and T4 are included in a candidate text group 30 of the piece of audio data B, and candidate texts T5, T6, and T7 are included in a candidate text group 30 of the piece of audio data C. In this case, the selecting unit 2040 computes a relevance index value for each of four pairs being "T1 and T3", "T1 and T4", "T2 and T3", and "T2 and T4", as comparison between the candidate text group 30 of the piece of audio data A, and the candidate text group 30 of the piece of audio data B. Likewise, the selecting unit 2040 computes a relevance index value for each of six pairs being "T1 and T5", "T1 and T6", "T1 and T7", "T2 and T5", "T2 and T6", and "T2 and T7", as comparison between the candidate text group 30 of the piece of audio data A, and the candidate text group 30 of the piece of audio data C. Further, the selecting unit 2040 computes a relevance index value for each of six pairs being "T3 and T5", "T3 and T6", "T3 and T7", "T4 and T5", "T4 and T6", and "T4 and T7", as comparison between the candidate text group 30 of the piece of audio data B, and the candidate text group 30 of the piece of audio data C.

As a relevance index value, any index value capable of quantifying relevance between sentences can be used. For example, an inter-sentence distance is used as the relevance index value. An inter-sentence distance between two sentences can be, for example, computed as a distance between vectors (hereinafter, sentence vectors), each of which represents a sentence. As the sentence vector, various vectors such as Bag of Words or TF-IDF can be used. Further, as the distance between vectors, a Euclidean distance, a cosine distance, Word Move's Distance, or the like can be used. Note that, a Euclidean distance and Word Move's Distance represent that, as a value decreases, a similarity between sentences increases. On the other hand, a cosine distance represents that, as a value increases, a similarity between sentences increases.

For example, in a case where a candidate text 32 is selected one by one from all candidate text groups 30, the selecting unit 2040 determines a candidate text 32 to be selected from each candidate text group 30, based on a sum of relevance index values to be computed for each pair of candidate texts 32 to be acquired from the selected candidate texts 32. In a case of using a relevance index value representing that, as a value decreases, a similarity between sentences increases, it is configured in such a way that a sum of relevance index values is minimized. On the other hand, in a case of using a relevance index value representing that, as a value increases, a similarity between sentences increases, it is configured in such a way that a sum of relevance index values is maximized. The processing can be formulated as follows, for example.

First, an index vector is defined as expressed by the following formula (1).

[Mathematical 1]

$$A \in C = \left\{ \left. \left( \begin{array}{c} c_1 \\ c_2 \\ \vdots \\ c_M \end{array} \right) \right| c_m \in \{1, 2, \ldots, N_m\}, m \in \{1, 2, \ldots, M\} \right\} \quad (1)$$

Herein, M denotes a total number of pieces of audio data 20. Further, m denotes an index of a piece of audio data 20, and represents at which position from a leading position, the piece of audio data 20 is located in a time-series order. $N_m$ denotes a total number of candidate texts 32 included in a candidate text group 30 of the m-th piece of audio data 20. $c_m$ denotes an index of a candidate text 32 to be selected from a candidate text group 30 of the m-th piece of audio data 20 from a leading position.

An index vector A represents an index of a candidate text 32 to be selected from each candidate text group 30. For example, A=(2, 3, 1) means that a second candidate text 32 is selected from a candidate text group 30 of a first piece of audio data 20, a third candidate text 32 is selected from a candidate text group 30 of a second piece of audio data 20, and a first candidate text 32 is selected from a candidate text group 30 of a third piece of audio data 20. Therefore, processing of determining a candidate text 32 to be selected from each candidate text group 30 can be formulated as processing of determining an index vector. The selecting unit 2040 determines a candidate text 32 to be selected from a candidate text group 30 of each piece of audio data 20 by determining an index vector, based on the above-described relevance index value.

In a case of using an inter-sentence distance such as a Euclidean distance, which represents that, as a value decreases, a similarity increases, for example, the selecting unit 2040 determines an index vector, as expressed by the following expression (2).

[Mathematical 2]

$$\operatorname*{argmin}_{A} \sum_{i=1}^{M} \sum_{j>i}^{M} d\left(V_{i,G_i(A)}, V_{j,G_j(A)}\right) \quad (2)$$

$V_{i,j}$: a sentence vector of the j-th candidate text in the i-th candidate text group
$d(v_{i,j}, v_{k,l})$: an inter-sentence distance between $v_{i,j}$ and $v_{k,l}$
$G_i(A)$=a function from which the i-th element of A is extracted On the other hand, in a case of using an inter-sentence distance such as a cosine distance, which represents that, as a value increases, a similarity increases, for example, the selecting unit 2040 determines an index vector, as expressed by the following expression (3).

[Mathematical 3]

$$\operatorname*{argmax}_{A} \sum_{i=1}^{M} \sum_{j>i}^{M} d\left(V_{i,G_i(A)}, V_{j,G_j(A)}\right) \quad (3)$$

Note that, an index vector may be determined by applying a weight with respect to each piece of audio data 20, and taking into consideration the weight. In a case of considering a weight, for example, the above-described expressions (2) and (3) can be expressed as the following expressions (4) and (5), respectively.

[Mathematical 4]

$$\operatorname*{argmin}_{A} \sum_{i=1}^{M} \sum_{j>i}^{M} w_i w_j d\left(V_{i,G_i(A)}, V_{j,G_j(A)}\right) \quad (4)$$

[Mathematical 5]

$$\operatorname*{argmax}_{A} \sum_{i=1}^{M} \sum_{j>i}^{M} w_i w_j d\left(V_{i,G_i(A)}, V_{j,G_j(A)}\right) \quad (5)$$

Herein, $w_i$ represents a weight to be applied to the i-th piece of audio data 20.

A method of applying a weight with respect to a piece of audio data 20 is optional. For example, a weight of a piece of audio data 20 including only a filler word such as "uh" or "hmm" is set to be smaller than a weight of another piece of audio data 20 (e.g., the former is set to be 0, and the latter is set to be 1). In addition to the above, for example, a weight of a piece of audio data 20 including a predetermined word may be set larger than a weight of another piece of audio data 20 (e.g., the former is set to be 2, and the latter is set to be 1). Further, an optimum weight may be determined by machine learning.

In the above-described expressions (2) to (5), an inter-sentence distance between selected candidate texts 32 is computed for each pair of any candidate text groups 30. Therefore, it is possible to determine a content of a remark represented by source data 10, also taking into consideration relevance between sentences not being adjacent to each other in time-series.

However, the selecting unit 2040 may compute an inter-sentence distance of a selected candidate text 32 only for a pair of candidate text groups 30 being adjacent to each other in time-series. In this case, for example, the following expressions (6) and (7) can be used instead of the expressions (2) and (3).

[Mathematical 6]

$$\underset{A}{\mathrm{argmin}} \sum_{i=1}^{M-1} d\left(V_{i,G_i(A)}, V_{i+1,G_{i+1}(A)}\right) \quad (6)$$

[Mathematical 7]

$$\underset{A}{\mathrm{argmax}} \sum_{i=1}^{M-1} d\left(V_{i,G_i(A)}, V_{i+1,G_{i+1}(A)}\right) \quad (7)$$

Note that, a weight may be applied to these expressions (6) and (7), as well as the expressions (4) and (5).

<Use Method of Processing Result>

According to the speech recognition apparatus 2000, a sentence (text) representing a content of a piece of audio data 20 acquired from source data 10 is determined for each piece of the audio data 20. Specifically, a sentence string representing a content of an utterance represented by source data 10 is acquired. A use method of a sentence string acquired as described above is optional. For example, the speech recognition apparatus 2000 outputs a generated sentence string. An output destination of the sentence string is optional. For example, the speech recognition apparatus 2000 stores the sentence string in a storage apparatus, causes a display apparatus to display the sentence string, or transmits the sentence string to any another apparatus (e.g., a transmission source of source data 10).

Since a sentence string is a text representing a content of an utterance represented by source data 10, by browsing the sentence string output as described above, a user of the speech recognition apparatus 2000 can visually recognize a content of an utterance represented by the source data 10. For example, in a case where source data 10 are recorded data of a conference, a sentence string to be acquired from the speech recognition apparatus 2000 can be handled as minutes data in which an utterance in the conference is converted into a text.

A part or all of the above-described example embodiment may also be described as the following supplementary notes, but is not limited to the following.

1. A speech recognition apparatus including:
 a candidate generating unit that generates, for each of a plurality of pieces of audio data acquired from a source audio signal including an utterance, a candidate text group including a plurality of candidate texts each being a candidate of a text representing a content of an utterance corresponding to the piece of audio data; and a selecting unit that selects, based on a comparison result between the plurality of candidate text groups, for each of pieces of the audio data, a candidate text representing a content of an utterance represented by the piece of audio data from the candidate text group generated for the piece of audio data, wherein
the candidate text represents a sentence.

2. The speech recognition apparatus according to supplementary note 1, wherein
 the selecting unit performs comparison between the candidate text groups generated for at least each of two pieces of audio data not being adjacent to each other in time-series.

3. The speech recognition apparatus according to supplementary note 1 or 2, wherein
 the selecting unit computes relevance between the candidate texts to be acquired from the candidate text groups being different from each other, and selects the candidate text from each candidate text group in such a way that a sum of pieces of the relevance to be computed is maximized.

4. The speech recognition apparatus according to supplementary note 3, wherein
 the selecting unit computes, as an index value representing relevance between the candidate texts, an inter-sentence distance between the candidate texts.

5. The speech recognition apparatus according to supplementary note 4, wherein
 the selecting unit
computes, as the index value, an inter-sentence distance representing that, as a value decreases, relevance between the candidate texts increases, and selects the candidate text from each candidate text group in such a way that a sum of the inter-sentence distances to be computed is maximized, or
computes, as the index value, an inter-sentence distance representing that, as a value increases, relevance between the candidate texts increases, and selects the candidate text from each candidate text group in such a way that a sum of the inter-sentence distances to be computed is minimized.

6. The speech recognition apparatus according to supplementary note 5, wherein
 the selecting unit computes, as a sum of inter-sentence distances, a weighted sum in which a weight is applied to each inter-sentence distance.

7. The speech recognition apparatus according to any one of supplementary notes 3 to 6, wherein
 the selecting unit computes relevance between the candidate texts for all pairs of the candidate text groups to be acquired from the plurality of generated candidate text groups.

8. The speech recognition apparatus according to any one of supplementary notes 3 to 6, wherein
 the selecting unit computes relevance between the candidate texts for all pairs of the candidate text groups being adjacent to each other in a time-series order among the plurality of generated candidate text groups.

9. A control method executed by a computer, including:
 a candidate generating step of generating, for each of a plurality of pieces of audio data acquired from a source audio signal including an utterance, a candidate text group including a plurality of candidate texts each being a candidate of a text representing a content of an utterance corresponding to the piece of audio data; and a selecting step of selecting, based on a comparison result between the plurality of candidate text groups, for each of pieces of the audio data, a candidate text representing a content of an utterance represented by the piece of audio data from the candidate text group generated for the piece of audio data, wherein the candidate text represents a sentence.

10. The speech recognition apparatus according to supplementary note 9, further including, in the selecting step, performing comparison between the candidate text groups generated for at least each of two pieces of audio data not being adjacent to each other in time-series.

11. The control method according to supplementary note 9 or 10, further including, in the selecting step, computing relevance between the candidate texts to be acquired from the candidate text groups being different from each other, and selecting the candidate text from each candidate text group in such a way that a sum of pieces of the relevance to be computed is maximized.

12. The control method according to supplementary note 11, further including, in the selecting step, computing, as an index value representing relevance between the candidate texts, an inter-sentence distance between the candidate texts.

13. The control method according to supplementary note 12, further including, in the selecting step, computing, as the index value, an inter-sentence distance representing that, as a value decreases, relevance between the candidate texts increases, and selecting the candidate text from each candidate text group in such a way that a sum of the inter-sentence distances to be computed is maximized, or computing, as the index value, an inter-sentence distance representing that, as a value increases, relevance between the candidate texts increases, and selecting the candidate text from each candidate text group in such a way that a sum of the inter-sentence distances to be computed is minimized.

14. The control method according to supplementary note 13, further including, in the selecting step, computing, as a sum of inter-sentence distances, a weighted sum in which a weight is applied to each inter-sentence distance.

15. The control method according to any one of supplementary notes 11 to 14, further including, in the selecting step, computing relevance between the candidate texts for all pairs of the candidate text groups to be acquired from the plurality of generated candidate text groups.

16. The control method according to any one of supplementary notes 11 to 14, further including, in the selecting step, computing relevance between the candidate texts for all pairs of the candidate text groups being adjacent to each other in a time-series order among the plurality of generated candidate text groups.

17. A program causing a computer to execute the control method according to any one of supplementary notes 9 to 16.

REFERENCE SIGNS LIST

10 Source data
20 Audio data

30 Candidate text group
32 Candidate text
1000 Computer
1020 Bus
1040 Processor
1060 Memory
1080 Storage device
1100 Input/output interface
1120 Network interface
2000 Speech recognition apparatus
2020 Candidate generating unit
2040 Selecting unit

What is claimed is:

1. A speech recognition apparatus comprising:

at least one memory configured to store instructions; and at least one processor configured to execute the instructions to perform operations comprising:

generating, for each of a plurality of pieces of audio data different from each other acquired from a source audio signal including an utterance of a plurality of sentences, a candidate text group including a plurality of candidate texts each being a candidate of a text representing a content of an utterance corresponding to the piece of audio data, each of the plurality of pieces of the audio data representing an audio signal corresponding to one sentence; and selecting, based on relevance between candidate texts included in a plurality of candidate text groups different from each other, for each of pieces of the audio data, a candidate text representing a sentence and a content of an utterance represented by the piece of audio data from the candidate text group generated for the piece of audio data.

2. The speech recognition apparatus according to claim 1, wherein selecting the candidate text comprises performing comparison between the candidate text groups generated for at least each of two pieces of audio data not being adjacent to each other in time-series.

3. The speech recognition apparatus according to claim 1, wherein selecting the candidate text comprises computing the relevance between candidate texts included in the candidate text groups being different from each other, and selecting the candidate text from each candidate text group in such a way that a sum of pieces of the relevance to be computed is maximized, and computing the relevance between the candidate texts comprises quantifying relevance between sentences represented by the candidate texts.

4. The speech recognition apparatus according to claim 3, wherein selecting the candidate text comprises computing, as an index value representing relevance between the candidate texts, an inter-sentence distance between the candidate texts.

5. The speech recognition apparatus according to claim 4, wherein selecting the candidate text comprises:

computing, as the index value, an inter-sentence distance representing that, as a value decreases, relevance between the candidate texts increases, and selecting the candidate text from each candidate text group in such a way that a sum of the inter-sentence distances to be computed is maximized; or computing, as the index value, an inter-sentence distance representing that, as a value increases, relevance between the candidate texts increases, and selecting the candidate text from each candidate text group in such a way that a sum of the inter-sentence distances to be computed is minimized.

6. The speech recognition apparatus according to claim 5, wherein
selecting the candidate text comprises computing, as a sum of inter-sentence distances, a weighted sum in which a weight is applied to each inter-sentence distance.

7. The speech recognition apparatus according to claim 3, wherein
selecting the candidate text comprises computing relevance between the candidate texts for all pairs of the candidate text groups to be acquired from the plurality of generated candidate text groups.

8. The speech recognition apparatus according to claim 3, wherein
selecting the candidate text comprises computing relevance between the candidate texts for all pairs of the candidate text groups being adjacent to each other in a time-series order among the plurality of generated candidate text groups.

9. A control method executed by a computer, comprising:
generating, for each of a plurality of pieces of audio data different from each other acquired from a source audio signal including an utterance of a plurality of sentences, a candidate text group including a plurality of candidate texts each being a candidate of a text representing a content of an utterance corresponding to the piece of audio data, each of the plurality of pieces of the audio data representing an audio signal corresponding to one sentence; and
selecting, based on relevance between candidate texts included in a plurality of candidate text groups different from each other, for each of pieces of the audio data, a candidate text representing a sentence and a content of an utterance represented by the piece of audio data from the candidate text group generated for the piece of audio data.

10. The control method according to claim 9, wherein
selecting the candidate text comprises performing comparison between the candidate text groups generated for at least each of two pieces of audio data not being adjacent to each other in time-series.

11. The control method according to claim 9, wherein
selecting the candidate text comprises computing the relevance between candidate texts included in the candidate text groups being different from each other, and selecting the candidate text from each candidate text group in such a way that a sum of pieces of the relevance to be computed is maximized, and
computing the relevance between the candidate texts comprises quantifying relevance between sentences represented by the candidate texts.

12. The control method according to claim 11, wherein
selecting the candidate text comprises computing, as an index value representing relevance between the candidate texts, an inter-sentence distance between the candidate texts.

13. The control method according to claim 12, wherein selecting the candidate text comprises:
computing, as the index value, an inter-sentence distance representing that, as a value decreases, relevance between the candidate texts increases, and selecting the candidate text from each candidate text group in such a way that a sum of the inter-sentence distances to be computed is maximized; or
computing, as the index value, an inter-sentence distance representing that, as a value increases, relevance between the candidate texts increases, and selecting the candidate text from each candidate text group in such a way that a sum of the inter-sentence distances to be computed is minimized.

14. The control method according to claim 13, wherein selecting the candidate text comprises computing, as a sum of inter-sentence distances, a weighted sum in which a weight is applied to each inter-sentence distance.

15. The control method according to claim 11, wherein selecting the candidate text comprises computing relevance between the candidate texts for all pairs of the candidate text groups to be acquired from the plurality of generated candidate text groups.

16. The control method according to claim 11, wherein selecting the candidate text comprises computing relevance between the candidate texts for all pairs of the candidate text groups being adjacent to each other in a time-series order among the plurality of generated candidate text groups.

17. A non-transitory storage medium storing a program causing a computer to execute a control method, the control method comprising:
generating, for each of a plurality of pieces of audio data different from each other acquired from a source audio signal including an utterance of a plurality of sentences, a candidate text group including a plurality of candidate texts each being a candidate of a text representing a content of an utterance corresponding to the piece of audio data, each of the plurality of pieces of the audio data representing an audio signal corresponding to one sentence; and
selecting, based on relevance between candidate texts included in a plurality of candidate text groups different from each other, for each of pieces of the audio data, a candidate text representing a sentence and a content of an utterance represented by the piece of audio data from the candidate text group generated for the piece of audio data.

18. The non-transitory storage medium according to claim 17, wherein selecting the candidate text comprises computing the relevance between candidate texts included in the candidate text groups being different from each other, and selecting the candidate text from each candidate text group in such a way that a sum of pieces of the relevance to be computed is maximized, and
wherein computing the relevance between the candidate texts comprises quantifying relevance between sentences represented by the candidate texts.

\* \* \* \* \*